(12) United States Patent
Hara et al.

(10) Patent No.: US 7,447,711 B2
(45) Date of Patent: Nov. 4, 2008

(54) METHOD AND SYSTEM FOR HIGH-AVAILABILITY DATABASE

(75) Inventors: Norihiro Hara, Kawasaki (JP); Mitsuo Miyazaki, Zushi (JP); Nobuo Kawamura, Atsugi (JP); Katsushi Yako, Yokohama (JP); Masataka Kan, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 10/769,351

(22) Filed: Jan. 30, 2004

(65) Prior Publication Data

US 2004/0210605 A1 Oct. 21, 2004

(30) Foreign Application Priority Data

Apr. 21, 2003 (JP) ............................. 2003-115185

(51) Int. Cl.
*G06F 17/30* (2006.01)
(52) U.S. Cl. .................................................... 707/202
(58) Field of Classification Search ............... 707/1–10, 707/100–104.1, 200–205; 709/201, 227
See application file for complete search history.

(56) References Cited

U.S. PATENT DOCUMENTS

| 6,247,055 | B1 * | 6/2001 | Cotner et al. | ............... | 709/227 |
| 2003/0126240 | A1 * | 7/2003 | Vosseler | ..................... | 709/221 |
| 2004/0039756 | A1 * | 2/2004 | Bromley | ..................... | 707/200 |

FOREIGN PATENT DOCUMENTS

WO    WO03/003252 A1    1/2003

OTHER PUBLICATIONS

Dewitt, David, et al., "Parallel Database Systems: The Future of High Performance Database Systems." *Communications of the ACM* (Jun. 1992) Vol. 35, No. 6:pp.85-98.

Gray, Jim, et al., "Transaction Processing: Concepts and Technique" *Morgan Kaufmann Publishers, Inc.* (1993) pp. v-649 and 924-927.

* cited by examiner

*Primary Examiner*—Mohammad Ali
*Assistant Examiner*—Navneet K Ahluwalia
(74) *Attorney, Agent, or Firm*—Townsend and Townsend and Crew LLP

(57) ABSTRACT

The present invention provides a system switching function for database management systems which requires no standby resources idling during normal operation. One aspect of the invention is directed to a method for processing databases in a system which includes a plurality of storage areas each storing a database and a plurality of computers each having a database management program running thereon which manages one of the plurality of storage areas. Each storage area is associated with only the computer managing the storage area. The method comprises, when a failure has occurred in one of the plurality of computers as a failed computer, obtaining preset substitution information indicating that the storage area managed by the database management program running on the failed computer is to be managed by the database management program running on another one of the plurality of computers as a substitute computer; and, based on the substitution information, changing association of the storage area with the failed computer to the substitute computer. The storage area is to be managed by the database management program running on the substitute computer.

12 Claims, 8 Drawing Sheets

FIG.6
(a)
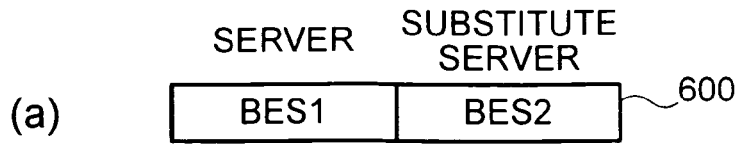
(b)
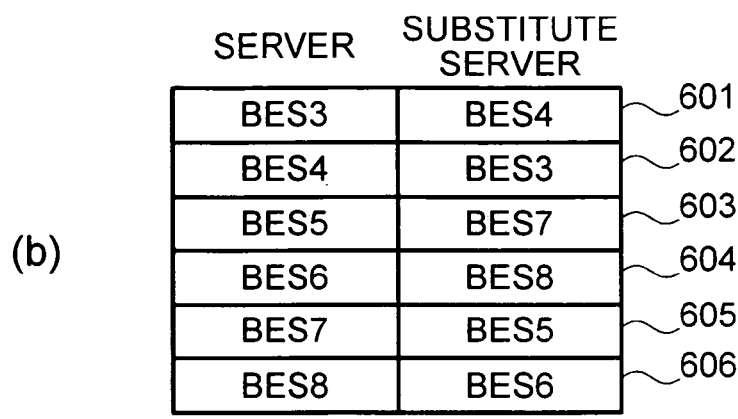
(c)
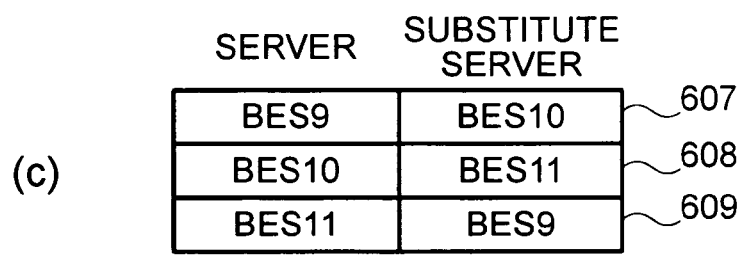
(d)
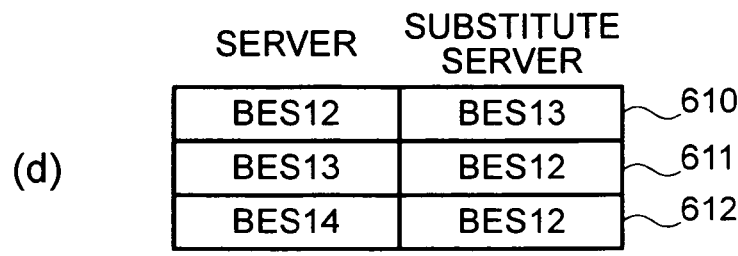
(e)
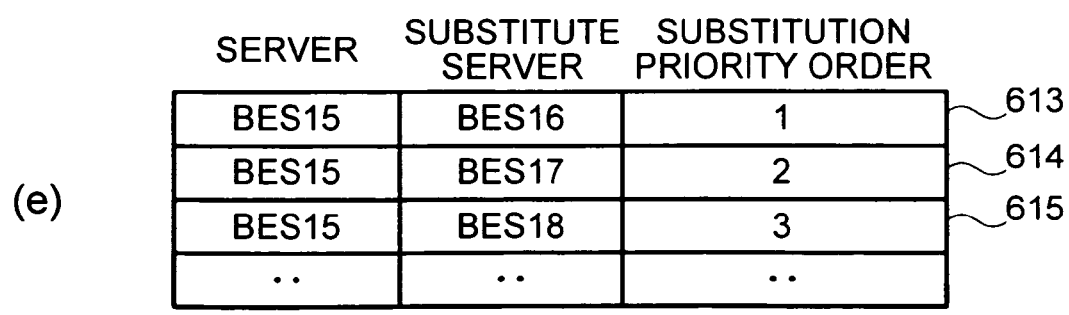

FIG.7
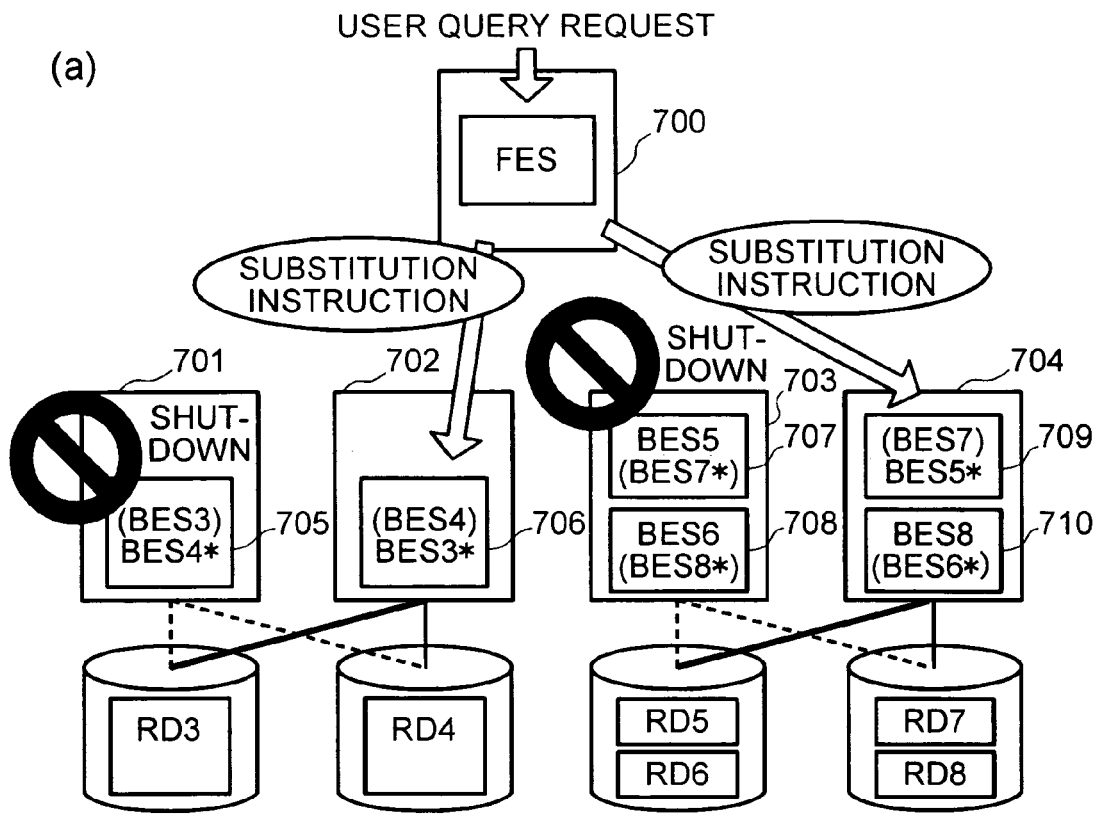
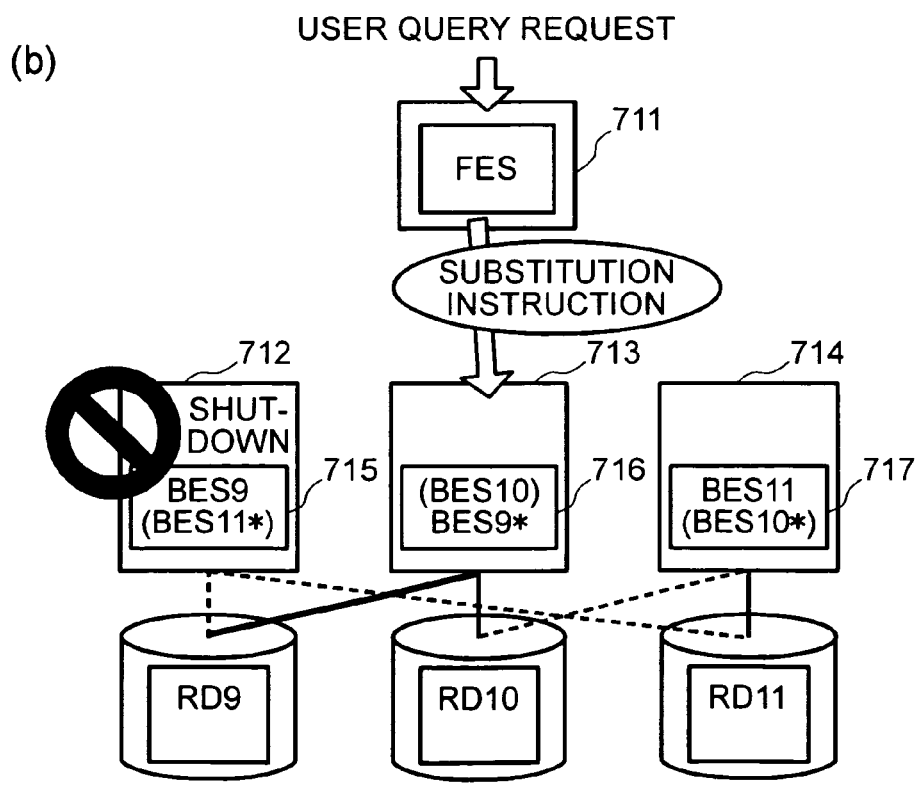

FIG.8
(a)
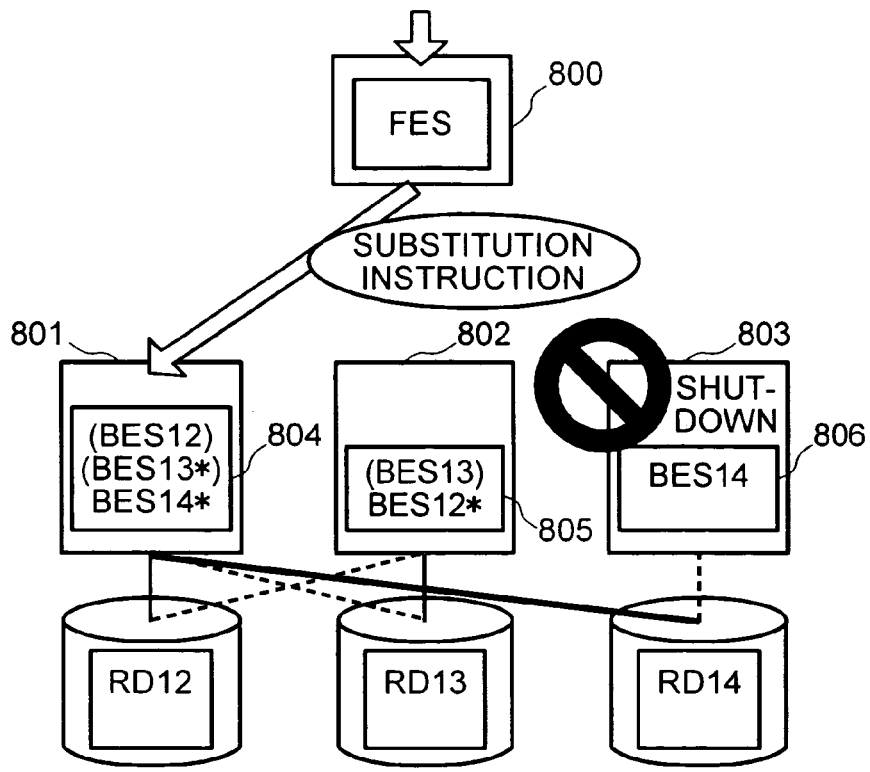
(b)
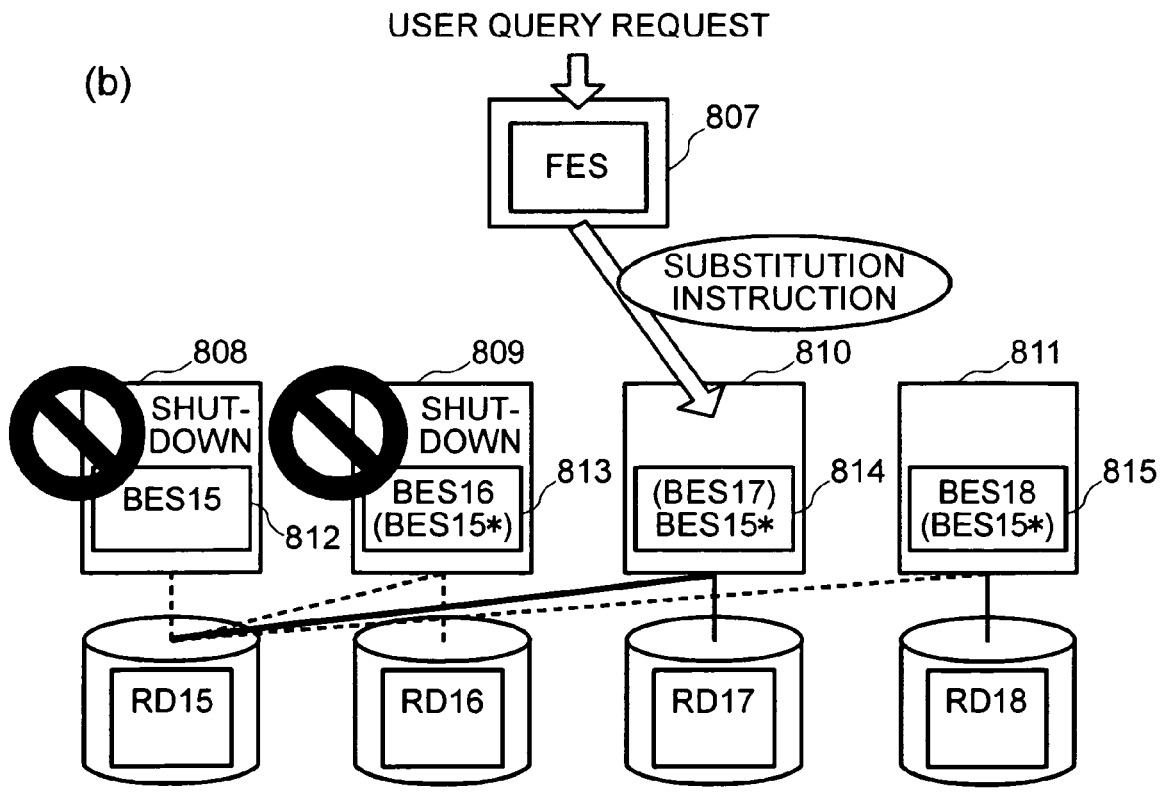

METHOD AND SYSTEM FOR HIGH-AVAILABILITY DATABASE

CROSS-REFERENCES TO RELATED APPLICATIONS

This application relates to and claims priority from Japanese Patent Application No. 2003-115185, filed on Apr. 21, 2003, the entire disclosure of which is incorporated herein by reference.

BACKGROUND OF THE INVENTION

The present invention relates to a data processing technique, and more particularly to a technique which is effective when applied to a database management system having a system switching function.

There is a need for a robust system operating 24 hours a day, every day in the world of Net business in which service interruption could lead to loss of a great business opportunity. What is important with such a system is to localize the influence of a failure when it has occurred and quickly restore the system. To quickly recover from failure, database (DB) systems conventionally use a system switching technique in which a standby system machine is installed in addition to a running system machine for performing service processing, beforehand, and when a failure has occurred in the running system machine, the standby system machine takes over the service processing.

For example, in literature published by Morgan Kaufmann Publishers in 1993, Jim Gray and Andreas Reuter disclose a hot standby noninterrupted system employing an HA (high availability) system configuration to provide resistance to DB failure. Jim Gray and Andreas Reuter, Morgan Kaufmann Publishers, 1993 "TRANSACTION PROCESSING: CONCEPTS AND TECHNIQUES", pp. 646-648, pp. 925-927.

In the literature "Parallel Database Systems: The Future of High Performance Database Systems", on the other hand, David DeWitt and Jim Gray disclose an architecture (technique) in which the processing load on a database is distributed to a plurality of processors for parallel processing (COMMNICATIONS OF THE ACM, Vol. 35, No. 6, 1992, pp. 85-98). In the "Shared everything, Shared disk" architecture employed by the above technique, each computer for executing DB processing can access all data, whereas in the "Shared nothing" architecture, each computer can access only the data stored in the disks connected to itself. Parallel Database Systems: The Future of High Performance Database Systems (David DeWitt and Jim Gray, COMMUNICATIONS OF THE ACM, Vol. 35, No. 6, 1992, pp. 85-98)

The "Shared nothing" architecture is advantageous over the "Shared everything, Shared disk" architecture in that it requires fewer resources to be shared between the components conducting the DB processing and thereby provides higher scalability. The "Shared nothing" architecture also employs a system switching technique in many cases to provide high availability.

BRIEF SUMMARY OF THE INVENTION

In a system switching method, a standby system machine needs to be set up in addition to a running system machine, as described above, and the standby system machine is in an idle state during normal service operation. It is possible to assign a portion of the ordinary service processing to the standby system machine in a mutual standby configuration. In order to increase the speed at which the systems are switched for restoration, however, a warm standby or hot standby method is often employed in which the standby system is started up to such an extent that it is ready to operate, making it necessary to prepare resources (processes and memory) for the standby system. Systems which require such "standby resources" idling during normal operation are disadvantageous in terms of TCO (Total Cost of Ownership) reduction in system formation and operation since they do not fully utilize their own resources during the normal operation.

Embodiments of the present invention are directed to solving the above problems. It is, therefore, a feature of the present invention to provide a control method for switching DB systems, which requires no "standby resources" idling during normal operation as described above and exhibits a short system switching time in the case of occurrence of a failure. In particular, a specific embodiment is intended to provide a database processing method which provides high availability for a parallel database management system using the "Shared nothing" architecture.

A database management system employing the "Shared nothing" architecture stores, beforehand, information on substitution relations between DB servers indicating which one of the DB servers is used as a substitute server if one of the other DB servers has failed. With this arrangement, the database management system receives a query from a user, and if the DB server to which a processing request is to be made is shut down, the database management system determines a substitute DB server based on the above information on the substitution relations between the DB servers and sends the processing request to the determined substitute server instead of the failed DB server. At that time, the database management system adds a substitution instruction to the request. Receiving the above request, the (substitute) DB server determines whether a substitution instruction is attached to the request, and if so, the (substitute) DB server performs data processing in place of the failed server.

When performing the data processing in place of the failed server, the substitute server switches to the environment of the failed server. If the substitute server previously substituted for the same failed server and has already switched to its environment, no execution environment switching is carried out this time. It is arranged that the database buffer used to access the database for data processing is the same as that used to access the DB storage area associated with the failed server. The database management system may automatically internally generate the above information on the substitution relations between the DB servers indicating which one of the DB servers is used as a substitute server if one of the other DB servers has failed. Furthermore, a plurality of substitute DB servers may be set for each DB server so that they can substitute for the DB server when it has been shut down, and a priority may be given to each substitute server.

One aspect of the invention is directed to a method for processing databases in a system which includes a plurality of storage areas each storing a database and a plurality of computers each having a database management program running thereon which manages one of the plurality of storage areas. Each storage area is associated with only the computer managing the storage area. The method comprises, when a failure has occurred in one of the plurality of computers as a failed computer, obtaining preset substitution information indicating that the storage area managed by the database management program running on the failed computer is to be managed by the database management program running on another one of the plurality of computers as a substitute computer; and, based on the substitution information, changing association of the storage area with the failed computer to the substitute computer. The storage area is to be managed by the database management program running on the substitute computer.

BRIEF DESCRIPTION OF THE DRAWINGS

FIG. 6 includes FIGS. 6A to 6E which are diagrams each showing an example of substitution information according to the embodiment;

FIG. 7 includes FIGS. 7A and 7B which are diagrams each showing a configuration of substitute servers according to the embodiment; and FIG. 8 includes FIGS. 8A and 8B which are diagrams each showing a configuration of substitute servers according to the embodiment.

DETAILED DESCRIPTION OF THE INVENTION

Description will be made of a database processing system applied to a database management system employing the "Shared nothing" architecture according to an embodiment of the present invention. This database processing system can immediately resume DB access processing when a failure has occurred (in a running system) without employing any dedicated resources for its standby systems. First, the general process according to an embodiment of the present invention will be briefly described with reference to FIG. 1.

The database management system (DBMS) of the present embodiment includes a processing request receiving server (or a front end server abbreviated as FES) 10 and a DB access server (or a back end server abbreviated as BES) 20.

The processing request receiving server (FES) 10 receives a query 50 from a user, analyzes it, generates a DB access request, and sends the DB access request to a DB access server. The FES 10 returns a DB access result to the user as necessary. The DB access server (BES) 20, on the other hand, receives the DB access request from the processing request receiving server (FES) 10, processes data in a DB storage area according to the request, and returns a result to the processing request receiving server (FES) 10 as necessary. The FES 10 and the BES 20 are each implemented by one or a plurality of processes.

Figure 1:
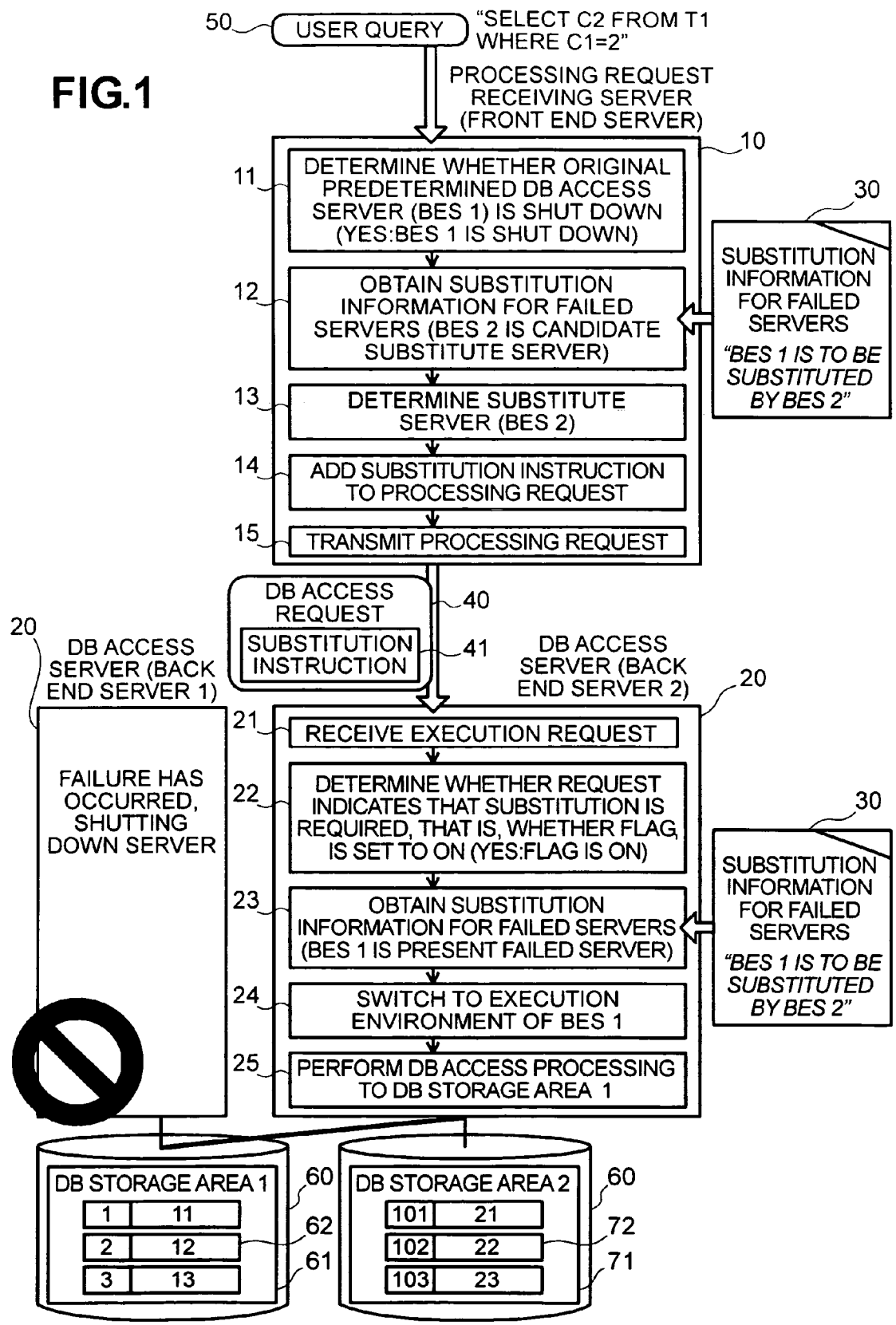
FIG. 1 is a diagram showing the general process according to an embodiment of the present invention.

The database management system of the present embodiment employs the "Shared nothing" architecture, and by use of various methods the database (for example, a table or an index) managed by this system, is divided into a plurality of subtables or subindexes which are each stored in one of a plurality of DB storage areas. Each DB storage area is associated with (controlled by) a predetermined DB access server. Each DB access server only accesses the data (for example, table data or index data) in the DB storage area associated with it. In the example of FIG. 1, normally, the BES 1 only processes access requests to the DB storage area 1, while the BES 2 only processes access requests to the DB storage area 2. The BES 1 and the BES 2 do not access the same DB storage area.

Normally, both the BES 1 and the BES 2 are in operation and therefore all resources (that is, processes and memories implementing the DB access servers) are in use. Then, for example, when a failure has occurred in the power supply, etc., of the information processing apparatus (on which the BES 1 is running) and thereby the BES 1 has been shut down, another server in operation (in this example, the BES 2) takes over the processing to continue the service. That is, the BES 2 processes the DB access request made to the BES 1.

Specifically, receiving the query request 50 from a user (application program), the FES 10 analyzes the query request to determine the DB storage area that stores the data to be accessed. If the DB access server designated to access the determined DB storage area is shut down, the FES 10 determines which DB access server will be a substitute server based on substitution information for failed servers at step 13. In this example, the BES 2 is determined to be the substitute server. The FES 10 then adds a substitution instruction to a DB access request 40 at step 14 and transmits the request to the DB access server BES 2 at step 15. The substitution instruction may be a flag or an identifier identifying the BES 1. This example uses a flag.

Receiving the DB access request 40 from the FES 10 (step 21), the DB access server BES 2 determines whether the DB access request is for the DB storage area 2 managed by the BES 2 itself or another DB storage area at step 22. This determination is made based on the value of the substitution instruction (flag). If the substitution instruction flag is set to ON, the DB access server BES 2 recognizes from the substitution information for failed servers that the access request is for the DB storage area 1 originally managed by the BES 1. The DB access server BES 2 obtains the substitution information for the failed servers 30 which is stored in a storage device 4 such as a hard disk device at step 23, and switches to the execution environment of the DB access server BES 1 at step 24. For example, the environment variables and memory information of the process implementing the DB access server BES 2 are replaced with those for the DB access server BES 1.

The DB access server BES 2 performs DB access processing in the new execution environment at step 25 to access the DB storage area 1 and manipulates data according to the request. In this example, the DB access server BES 2 transmits to the FES 10 the table data 62 (that is, a value of 12) stored in the DB storage area 1 (61) in the database 60 as the execution result. Receiving the table data, the FES 10 returns it to the user.

In this example, it is assumed that the substitution information for failed servers 30 is stored in the DBMS by a user such as a manager of the DBMS beforehand. However, the DBMS may automatically internally generate this information, making it possible to reduce the burden on the manager.

Thus, the DB access server BES 2 processes an access request to the DB storage area 1 in place of the DB access server BES 1 when a failure has occurred in the DB access server BES 1. Such a server is referred to as a substitute server in this specification. When a DB access server BES works as a substitute server and performs processing, the BES process is not changed for substitute server processing, eliminating the need for generating an extra process.

As described above, a substitute server for each server may be registered or determined beforehand. With this arrangement, when a failure has occurred in a BES, the FES detects the failed BES, and by use of a substitution instruction, the FES instructs the substitute server in operation to perform processing in place of the failed BES, making it possible to immediately resume the DB access processing when a failure has occurred without employing any dedicated resources for the standby system.

In this example, the FES and the BESs are each installed on a different information processing apparatus. However, they may be set up on the same information processing apparatus, making it possible to efficiently use the hardware resources. Furthermore, the functions of the FES and the BES of the present embodiment may be implemented as those of a single DB server, making it unnecessary for the manager of the database management system to handle the FES and the BES separately, thereby reducing the management cost.

Figure 2:
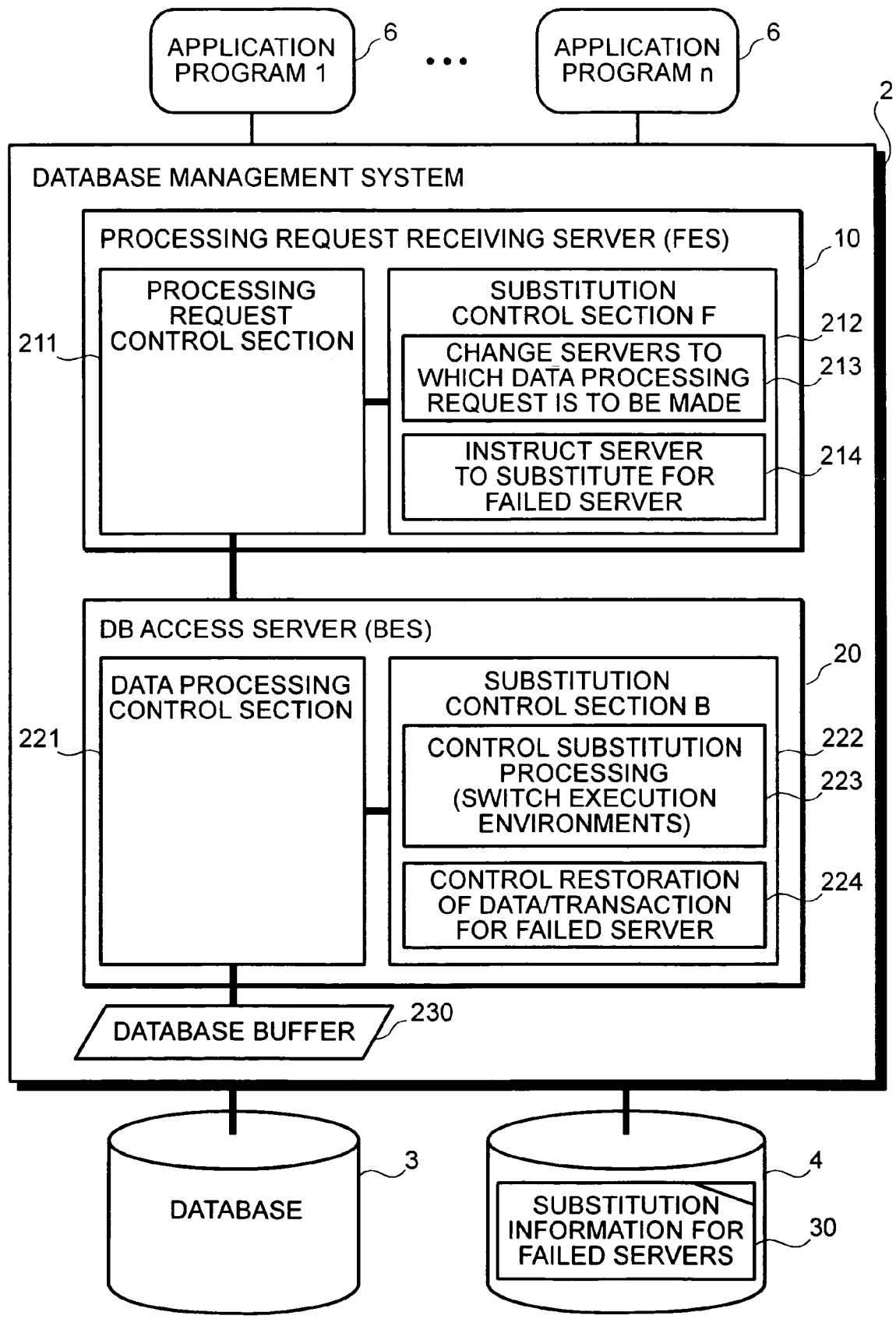
FIG. 2 is a diagram showing the functional blocks of a database processing system according to an embodiment of the present invention.

FIG. 2 schematically shows the configuration of a database management system according to the present embodiment. FIG. 2 shows application programs 6 created by users and a database management system 2 for managing the entire database system including queries and resources. The database management system 2 includes a processing request receiving server (or a front end server abbreviated as FES) 10 and a DB access server (or a back end server abbreviated as BES) 20. The database management system 2 further includes a data buffer 230 and has a database 3 for permanently or temporarily storing data to be accessed, and substitution information for failed servers 30.

The processing request receiving server (FES) 10 receives a query from an application program 6, analyzes it, generates a DB access request, and sends the DB access request to a DB access server. The processing request receiving server (FES) 10 returns a DB access result to the application program 6 as necessary. The DB access server (BES) 20 receives the DB access request from the processing request receiving server 10 and accesses the database 3 stored in an external storage apparatus through the database buffer 230. In the above example of FIG. 1, the substitute server (the BES 2) uses the database buffer used by the failed original BES (1) to perform DB access processing. That is, the failed original BES and the substitute server (BES) share the database buffer.

The above database management system 2 is connected to other systems through a network. It should be noted that the processing request receiving server (FES) 10 and the DB access server (BES) 20 may not necessarily be set up on the same information processing apparatus. They may be each installed on a different information processing apparatus and connected to each other through a network, functioning as a single database management system. Further, the database management system may include a plurality of FESs to distribute requests received from a large number of users. Still further, the database management system may include a plurality of BESs, making it possible to increase the level of parallel operation on data and perform data processing on even a large-scale database at high speed.

The processing request receiving server 10 includes a processing request control section 211 for performing syntax analysis and semantic analysis of a query, determining an appropriate processing procedure, generating code according to the processing procedure, and making a DB access request to the DB access server 20. The processing request receiving server 10 also includes a substitution control section F 212 for, when the processing request control section 211 makes a DB access request, determining the operational state of the target DB access server to which the request is to be sent, changing the target DB access server as necessary (at step 213), and instructing the new target DB access server to substitute for the original target DB access server (at step 214).

The DB access server 20 includes a data processing control section 221 for performing access control of data in the database 3 according to a DB access request (generated code) received from the processing request receiving server 10. The DB access server 20 also includes a substitution control section B 222 for, when the data processing control section 221 has received the DB access request, determining whether the request indicates that substitution is required, and switching to the necessary execution environment for the substitute server (at step 223). The substitution control section B has a function to control restoration of the data and transaction for the failed server. Specifically, when a failure has occurred in a server (original server), the substitution control section B (in the substitute server) restores the DB storage area, etc., for the original server and cancels the current ongoing processing so as to be able to restore the transaction.

Figure 3:
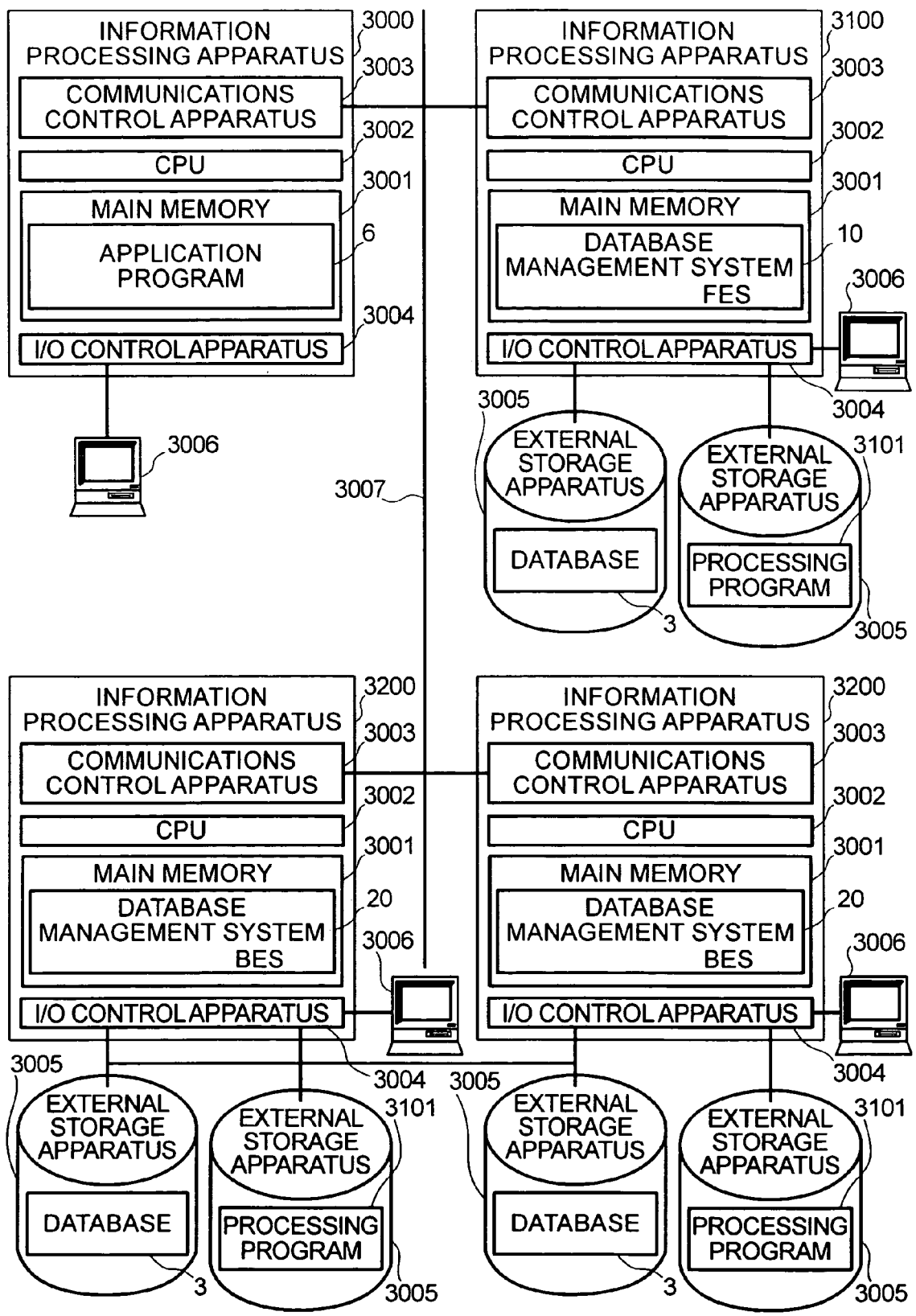
FIG. 3 is a diagram showing a hardware configuration of a computer system according to the embodiment.

FIG. 3 is a diagram showing a hardware configuration of a computer system according to the present embodiment. This computer system includes information processing apparatuses 3000, 3100, and 3200.

The information processing apparatus 3000 is made up of a CPU 3002, a main memory 3001, a communications control apparatus 3003, an I/O control apparatus 3004, and a terminal 3006. An application program 3008 executed by the CPU 3002 runs on the main memory 3001. When the application program 3008 has sent the user query 50 to the processing request receiving server 10 of the DBMS 2, the query request (the sent user query) goes through the communications control apparatus 3003 of the information processing apparatus 3000, a network 3007, and the communications control apparatus 3003 of the information processing apparatus 3100 before reaching the processing request receiving server 10.

The information processing apparatus 3100 is made up of a CPU 3002, a main memory 3001, a communications control apparatus 3003, an I/O control apparatus 3004, external storage apparatuses 3005 (magnetic disk drives, etc.), and a terminal 3006. The database management system 2 including the processing request receiving server 10, described above with reference to FIG. 2, is executed by the CPU 3002 and runs on the main memory 3001 in the information processing apparatus 3100. An external storage apparatus 3005 stores the database 3 managed by the database management system 2. A program 3101 implementing the database management system 2 is stored in another external storage apparatus 3005. The processing request receiving server 10 writes/reads data to/from the external storage apparatuses 3005 through the I/O control apparatus 3004 and exchanges data with other information processing apparatuses connected to the processing request receiving server 10 through the communications control apparatus 3003 and the network 3007.

The information processing apparatus 3200 is made up of a CPU 3002, a main memory 3001, a communications control apparatus 3003, an I/O control apparatus 3004, external storage apparatuses 3005 (magnetic disk drives, etc.) and a terminal 3006. The database management system 2 including the DB access server 20, described above with reference to FIG. 2, is executed by the CPU 3002 and runs on the main memory 3001 in the information processing apparatus 3200. An external storage apparatus 3005 stores the database 3 managed by the database management system 2. A program 3101 implementing the database management system 2 is stored in another external storage apparatus 3005. The DB access server 20 writes/reads data to/from the external storage apparatuses 3005 through the I/O control apparatus 3004 and exchanges data with other information processing apparatuses connected to the DB access server 20 through the communications control apparatus 3003 and the network 3007.

The external storage apparatuses 3005 each storing a database 3 associated with (managed by) one of the two information processing apparatuses 3200 are shared disks and can be accessed by other information processing apparatuses. Clusterware or the like that controls the normal operation and the switchover operation of the database management system 2 performs access control to the above shared disks.

Figure 4:
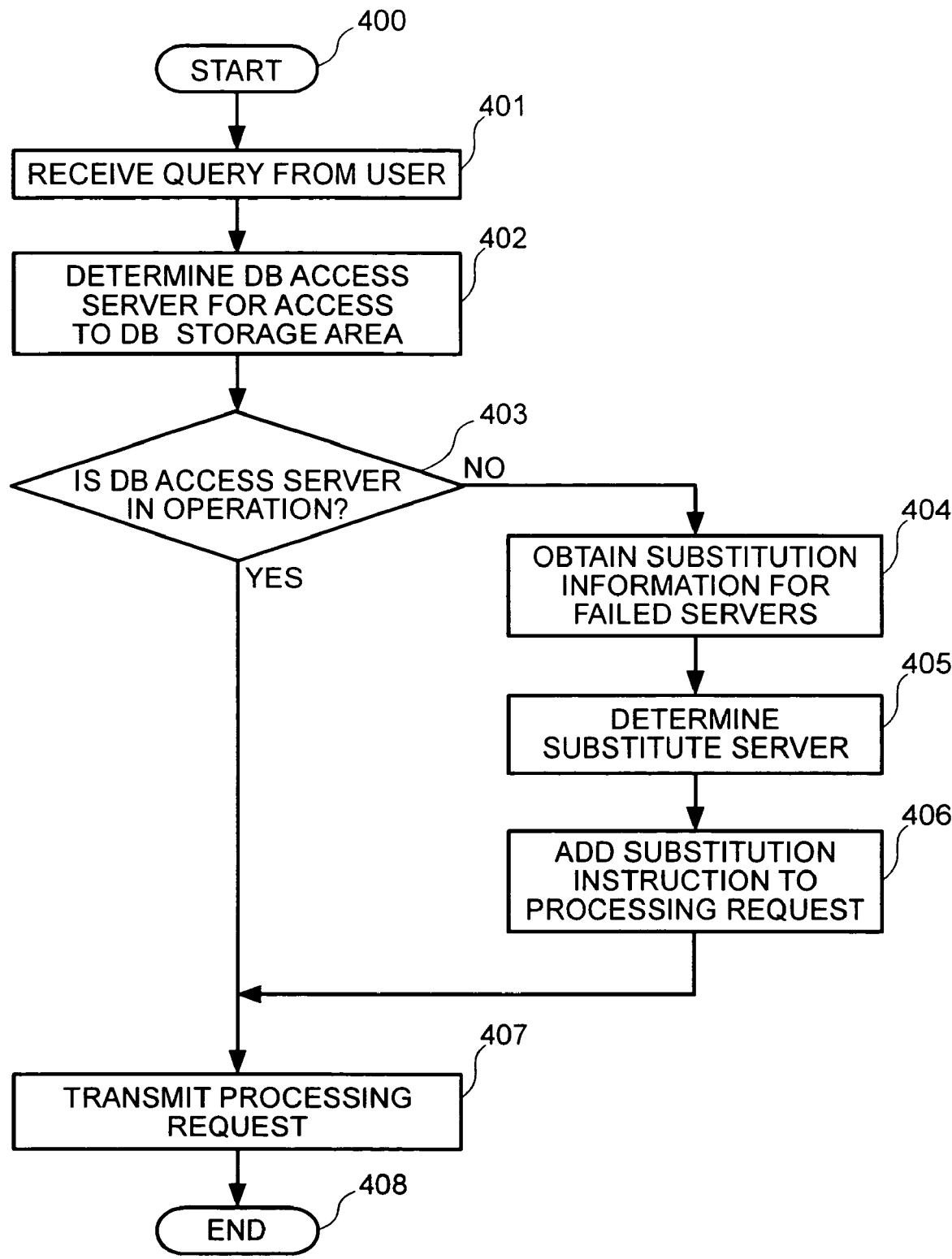
FIG. 4 is a flowchart showing a portion of the processing procedure performed by a processing request control section and a substitution control section F according to the embodiment.

FIG. 4 is a flowchart showing a portion of the processing procedure performed by the processing request control section and the substitution control section F according to the present embodiment.

First of all, step 401 receives a query from a user, and based on information obtained as a result of analyzing the query from the user, step 402 determines the DB access server designated to access the DB storage area used for executing the query. Then, step 403 determines whether the determined DB access server is in operation. If it is in operation, the processing proceeds to step 407 which transmits a processing request to the determined DB access server.

If, on the other hand, the DB access server has been shut down and therefore is not in operation, the processing proceeds to step 404 which obtains the substitution information for failed servers 30 concerning the failed DB access server. Then, step 405 determines a substitute server based on the obtained substitution information for failed servers 30. Step 406 adds a substitution instruction to a processing request, that is, sets the substitution instruction flag to ON. After that, the processing proceeds to step 407 which transmits the processing request to the substitute DB access server.

Figure 5:
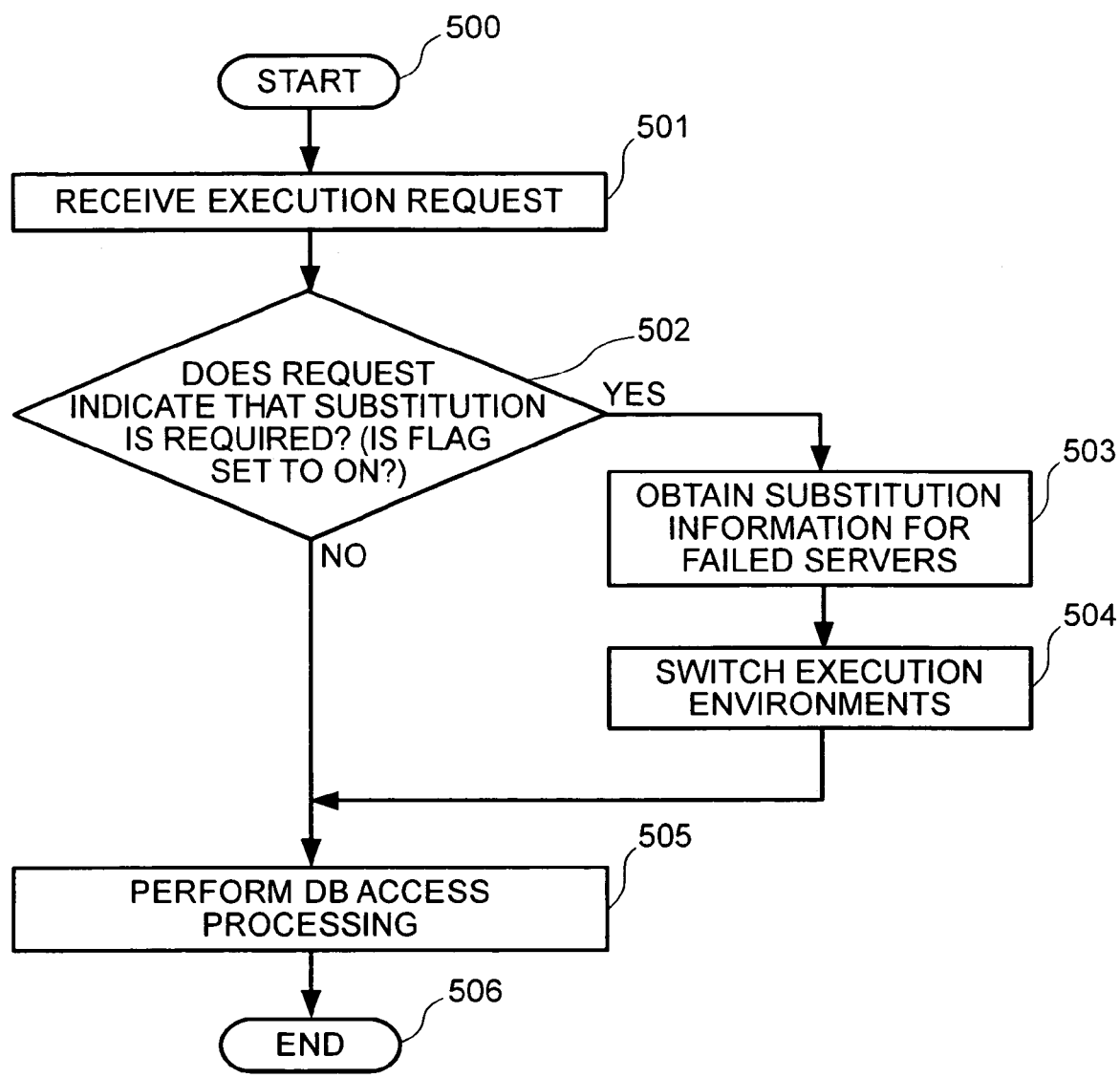
FIG. 5 is a flowchart showing a portion of the processing procedure performed by a data processing control section and a substitution control section B according to the embodiment.

FIG. 5 is a flowchart showing a portion of the processing procedure performed by the data processing control section and the substitution control section B according to the present embodiment. The DB access processing below is performed after the transmission of a processing request illustrated by the flowchart of FIG. 4.

First, step 501 receives an execution request from the FES, and step 502 determines whether the received execution request indicates that substitution is required. If the substitution instruction flag is set to ON, the processing proceeds to step 503 which obtains the substitution information for failed servers 30 to check for the server (failed server) to be substituted for by this DB access server. Step 504 obtains the name of the server to be substituted for from the obtained substitution information for failed servers 30 and switches to the execution environment of the server. Step 505 performs DB access processing in the new execution environment, accessing the DB storage area assigned to the failed DB access server in place of the server to manipulate data.

If, on the other hand, the substitution instruction flag is set to OFF at step 502, no execution environment switching operation is carried out, and step 505 accesses the DB storage area assigned to this server to manipulate data.

Step 504 may check the current execution environment and may not switch execution environments when the BES (this BES) which is to process the processing request is the currently running BES. Furthermore, at step 505, this BES may return to its original execution environment after the DB access processing has been performed. The above steps may be optimally controlled by a balancer or a scheduler for controlling the processing request.

FIG. 6 includes FIGS. 6A to 6E which are diagrams each showing an example of the substitution information according to the present embodiment. In the example of FIG. 6A, the substitution information for failed servers 30 includes the server name of each DB access server and the server name of the substitute server for each DB access server. When a DB access server has failed, the substitute server accesses the DB storage area assigned to the failed DB access server in place of the failed DB access server. A substitution information entry 600 indicates that when the DB access server BES 1 has been shut down due to a failure, the BES 2 takes over the processing as a substitute server.

FIG. 7 includes FIGS. 7A and 7B which are diagrams showing configurations of substitute servers corresponding to FIGS. 6B and 6C, respectively, while FIG. 8 includes 8A and 8B which are diagrams showing configurations of substitute servers corresponding to FIGS. 6D and 6E, respectively.

The substitution information shown in FIG. 6B corresponds to the configuration of substitute servers shown in FIG. 7A. Substitution information entries 601 and 602 in FIG. 6C indicate that a DB access server BES 3 (705) on the information processing apparatus 701 and a DB access server BES 4 (706) on the information processing apparatus 702 are set as each other's substitute servers. That is, they are in a mutual substitution configuration. Specifically, when the BES 3 has been shut down, the BES 4 takes over the processing from the BES 3 (as indicated by the substitution information 601). When the BES 4 has been shut down, on the other hand, the BES 3 takes over the processing from the BES 4 (as indicated by the substitution information 602).

Further, the BES 5 and the BES 6 on the information processing apparatus 703 and the BES 7 and the BES 8 on the information processing apparatus 704 are also in a mutual substitution configuration. Specifically, when the BES 5 has been shut down, the BES 7 takes over the processing from the BES 5, and when the BES 6 has been shut down, the BES 8 takes over the processing from the BES 6. On the other hand, when the BES 7 has been shut down, the BES 5 takes over the processing from the BES 7, and when the BES 8 has been shut down, the BES 6 takes over the processing from the BES 6.

The notational convention used by FIGS. 7 and 8 will be described with examples. In FIG. 7A, the parentheses "(" and ")" in the indication "(BES 4\*)" in the DB server 705 indicates that the DB server is not operating as the BES 4, that is, the DB server does not access the DB storage area RD 4 for the current DB processing (it is operating as the BES 3). Further, the asterisk "\*" in the same indication indicates that the DB server 705 is designated as the substitute server for the server to which the asterisk "\*" is attached (that is, BES 4).

FIG. 7A shows the following operational states of servers. A failure has occurred in the information processing apparatuses 701 and 703, and as a result the BES 3, BES 5, and BES 6 have been shut down. A request for data manipulation requiring access to the DB storage area RD 3 is transmitted to the DB access server 706 after a substitution instruction is attached to it. Receiving the request, the process implementing the DB access server 706 performs the processing as the BES 3, accessing the RD 3.

A request for data manipulation requiring access to the RD 5 is transmitted to the DB access server 709 after a substitution instruction is attached to it. Receiving the request, the process implementing the DB access server 709 performs the processing as the BES 5, accessing the RD 5.

The substitution information shown in FIG. 6C corresponds to the configuration of substitute servers shown in FIG. 7B. Substitution information entries 607, 608, and 609 in FIG. 6C indicate that a DB access server BES 9 (715) on an information processing apparatus 712, a DB access server BES 10 (716) on an information processing apparatus 713, and a DB access server BES 11 (717) on an information processing apparatus 714 are set as one another's substitute servers. That is, they are in a unidirectional ring substitution configuration. Specifically, when the BES 9 has been shut down, the BES 10 takes over the processing from the BES 9

(as indicated by the substitution information 607). When the BES 10 has been shut down, on the other hand, the BES 11 takes over the processing from the BES 10 (as indicated by the substitution information 608). Further, when the BES 11 has been shut down, the BES 9 takes over the processing from the BES 11 (as indicated by the substitution information 609).

FIG. 7B shows the following operational states of servers. A failure has occurred in the information processing apparatus 712, and as a result the BES 9 has been shut down. A request for data manipulation requiring access to the DB storage area RD 9 is transmitted to the DB access server 716 after a substitution instruction is attached to it. Receiving the request, the process implementing the DB access server 716 performs processing as the BES 9, accessing the RD 9.

The substitution information shown in FIG. 6D corresponds to the configuration of substitute servers shown in FIG. 8A. Substitution information entries 610, 611, and 612 in FIG. 6D indicate the substitute servers for a DB access server BES 12 (804) on an information processing apparatus 801, a DB access server BES 13 (805) on an information processing apparatus 802, and a DB access server BES 14 (806) on an information processing apparatus 803. In particular, the substitution information entries 611 and 612 indicate that the BES 12 is set as the substitute server for both the BES 13 and the BES 14. That is, they are in an n:1 substitution configuration, where n is 2 in the above example.

FIG. 8A shows the following operational states of servers. A failure has occurred in the information processing apparatus 803, and as a result the BES 14 has been shut down. A request for data manipulation requiring access to the DB storage area RD 14 is transmitted to the DB access server 804 after a substitution instruction is attached to it. Receiving the request, the process implementing the DB access server 804 performs processing as the BES 14, accessing the RD 14.

The substitution information shown in FIG. 6E corresponds to the configuration of substitute servers shown in FIG. 8B. Substitution information entries 613, 614, and 615 in FIG. 6E indicate that DB access servers BES 16 (813), BES 17 (814), and BES 18 (815) are set as the substitute servers for a DB access server BES 15 (812) on an information processing apparatus 808. When the BES 15 has been shut down, the substitute server for the BES 15 is determined based on the values of the substitution priority order entries in the substitution information. That is, these DB access servers are in an n-stage substitution configuration.

The actual substitution server for the BES 15 is determined as follows. First of all, the BES 16, indicated by the substitution information 613, is designated as the substitute server (candidate). If the BES 16 also has been shut down, the BES 17, indicated by the substitution information 614, is set as the substitute server (candidate) according to the substitution priority order. Further, if the BES 17 also has been shut down, the BES 18 is set as the substitution server.

FIG. 8B shows the following operational states of servers. A failure has occurred in the information processing apparatus 808, and as a result the BES 15 has been shut down. Furthermore, another failure has occurred in the information processing apparatus 809, and as a result the BES 16 also has been shut down. A request for data manipulation requiring access to the DB storage area RD 15 is transmitted to the DB access server 814 after a substitution instruction is attached to it according to the substitution information 614. Receiving the request, the process implementing the DB access server 814 performs processing as the BES 15, accessing the RD 15.

The above processing illustrated by the flowcharts in FIGS. 4 and 5 is executed by programs running on the computer system shown in FIG. 3. In some embodiments, the programs may not be stored in external storage apparatuses directly and physically connected to the computer system, unlike the example of FIG. 3. Instead, the programs may be stored on computer-readable/writable storage media such as hard disk drives and flexible disk drives. Furthermore, they may be stored in external storage apparatuses connected to a different information processing apparatus which is connected through a network to an information processing apparatus constituting the computer system shown in FIG. 3.

Embodiments of the present invention can provide a method and system for processing a database, capable of quickly resuming DB processing service in the case of occurrence of a failure without employing any "standby resources" idling during normal operation in a database management system using the "Shared nothing" architecture.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A method for processing databases in a system comprising a processing request receiving server, a plurality of storage areas, and a plurality of database access servers, wherein each storage area in the plurality of storage areas includes as least one database, and wherein each database access server in the plurality of database access servers is associated with a storage area in the plurality of storage areas, thereby enabling said each database access server to manage and access its associated storage area, the method comprising:

when a failure has occurred in a first database access server in the plurality of database access servers, obtaining preconfigured substitution information including a mapping between the first database access server and a second database access server in the plurality of database access servers, wherein the first and second database access servers are distinct;

based on the mapping, re-associating a storage area associated with the first database access server such that the storage area becomes associated with the second database access server, thereby enabling the second database access server to manage and access the storage area;

receiving a processing request directed to the first database access server, the processing request being received by the processing request receiving server;

determining whether the first database access server is in operation;

if the first database access server is in operation, forwarding the processing request to the first database access server, wherein the first database access server is configured to process the forwarded processing request;

if the first database access server is not in operation:
identifying the second database access server as a substitute for the first database access server based on the preconfigured substitution information;
modifying the processing request to include a substitution instruction; and
transmitting the modified processing request to the second database access server, wherein the second database access server is configured to identify the substitution instruction in the modified processing request, obtain execution environment information for the first database access server, switch an execution environment of the second database access server to that of the first database access server based on the execution environment information, and process the processing request on behalf of the first database access server.

2. The method as recited in claim 1, wherein the preconfigured substitution information comprises a substitution configuration in which a group of database access servers from the first database access server to a last database access server are associated with each other such that the first database access server is to manage a storage area for the second database access server, the second database access server is to manage a storage area for a third database access server, and the last database access server is to manage a storage area for the first database access server.

3. The method as recited in claim 1, wherein the preconfigured substitution information comprises an n-to-1 substitution configuration whereby one database access server is to manage storage areas for n other database access servers.

4. The method of claim 1, wherein the mapping associates an identifier of the first database access server with an identifier of the second database access server, the mapping indicating that the storage area associated with the first database access server is to be associated with the second database access server when a failure occurs in the first database access server.

5. The method of claim 4, wherein the mapping further indicates that a storage area associated with second database access server is to be associated with the first database access server when a failure occurs in the second database access server.

6. The method of claim 1,
wherein the preconfigured substitution information includes a plurality of mappings between database access sewers, each mapping including priority information indicating a priority of said each mapping with respect to other mappings.

7. A system for processing databases, the system comprising:
a processing request receiving server;
a plurality of storage areas, each storage area including at least one database; and
a plurality of database access servers, each database access server being associated with a storage area in the plurality of storage areas, thereby enabling said each database access server to manage and access its associated storage area,
wherein the processing request receiving server is configured to:
receive a processing request directed to a first database access server in the plurality of database access servers;
determine whether the first database access server is in operation;
if the first database access server is in operation, forward the processing request to the first database access server, wherein the first database access server is configured to process the forwarded processing request;
if the first database access server is not in operation:
obtain preconfigured substitution information including a mapping between the first database access server and a second database access server in the plurality of database access servers;
identify the second database access server as a substitute for the first database access server based on the preconfigured substitution information;
modify the processing request to include a substitution instruction; and
transmit the modified processing request to the second database access server, wherein the second database access server is configured to identify the substitution instruction in the modified processing request, obtain execution environment information for the first database access server, switch an execution environment of the second database access server to that of the first database access server based on the execution environment information, and process the processing request on behalf of the first database access server.

8. The system as recited in claim 7, wherein the preconfigured substitution information comprises a substitution configuration in which a group of database access servers from the first database access server to a last database access server are associated with each other-such that the first database access server is to manage a storage area for the second database access server, the second database access server is to manage a storage area for a third database access server, and the last database access server is to manage a storage area for the first database access server.

9. The system as recited in claim 7, wherein the preconfigured substitution information comprises an n-to-1 substitution configuration whereby one database access server is to manage storage areas for n other database access servers.

10. The system of claim 7, wherein the mapping associates an identifier of the first database access server with an identifier of the second database access server, the mapping indicating that a storage area associated with the first database access server is to be associated with the second database access server when a failure occurs in the first database access server.

11. The system of claim 10, wherein the mapping further indicates that a storage area associated with second database access server is to be associated with the first database access server when a failure occurs in the second database access server.

12. The system of claim 7,
wherein the preconfigured substitution information includes a plurality of mappings between database access servers, each mapping including priority information indicating a priority of said each mapping with respect to other mappings.

* * * * *